March 27, 1973 R. K. BHATTACHARYYA 3,723,257

METHODS AND APPARATUS FOR TRIMMING THIN-FILM DEVICES TO VALUE BY MEANS OF A COMPUTER-CONTROLLED ANODIZATION PROCESS

Filed March 30, 1970 3 Sheets-Sheet 1

INVENTOR
R.K.BHATTACHARYYA
By Bryan W. Sheffield
ATTORNEY

United States Patent Office 3,723,257

Patented Mar. 27, 1973

3,723,257
METHODS AND APPARATUS FOR TRIMMING THIN-FILM DEVICES TO VALUE BY MEANS OF A COMPUTER-CONTROLLED ANODIZATION PROCESS

Ranendra Kumar Bhattacharyya, Kendall Park, N.J., assignor to Western Electric Company, Incorporated, New York, N.Y.

Filed Mar. 30, 1970, Ser. No. 23,766
Int. Cl. B01k *3/00;* C23b *5/48*
U.S. Cl. 204—15 16 Claims

ABSTRACT OF THE DISCLOSURE

A computer-controlled anodization process for trimming thin-film resistors, and the like, to value. Briefly, the initial resistance of the device to be trimmed is measured and a trial anodization conducted. Next, the resistance of the device is re-measured and the parameters of the equation characterizing the anodization process calculated. The time required to attain the desired resistance tion is terminated prior to expiration of this time intervalue is predicted from the above equation, but anodizaval. The parameters of the anodization are then re-calculated, one or more times, making adaptive changes to the algorithm used to rapidly converge the process towards the desired resistance value.

BACKGROUND OF THE INVENTION

Broadly speaking, this invention relates to methods and apparatus for trimming thin-film devices to value. More specifically, in a preferred embodiment, this invention relates to methods and apparatus for trimming thin-film devices to value by means of a computer-controlled anodization process.

With the current trend towards miniaturization of electronic equipment, the use of thin-film devices, for example, thin-film resistors and thin-film capacitors, is becoming increasingly widespread. In addition to their small dimensions, these thin-film devices exhibit outstanding electrical and mechanical stability and are used whenever the requirements for accuracy and reliability are critical. A typical example of their use is in the amplifying circuits which are used in the transatlantic cables, which circuits must operate continuously, without failure, for 25 years or more.

Consider the thin-film resistor, which typically comprises a thin film of a film-forming valve metal, such as tantalum, which has been deposited by sputtering, or otherwise, upon an insulating substrate, such as glass or ceramic. After the thin metallic film has been sputtered onto the substrate, the desired resistor configuration is generated by selectively masking a portion of the metal film with an etch-resistant material and then etching the film to remove the unmasked portions thereof. The dimensions of the resistor so formed determine its resistance value.

Modern sputtering techniques can provide close control over the thickness of the metallic film which is deposited during the sputtering process, but not, unfortunately, to that degree of accuracy which would be necessary to directly manufacture thin-film resistors, and the like, to tolerance limits of 0.1% or less of their nominal value. It is thus standard practice in the art to deliberately deposit onto the substrate a metallic film which is somewhat thicker than is actually required. The resistor, or other device, is then trimmed to value by heating or anodizing the thin-film material to create a layer of metallic oxide on the upper surface thereof. Oxides of film-forming valve metals, such as tantalum, are electrically nonconductive and are, of course, formed at the expense of the underlying unoxidized metallic film remaining. Thus, the volume of the conductive metal film which lies beneath the layer of metallic oxide is steadily depleted as the oxide layer grows in thickness. This, in turn, steadily increases the overall electrical resistance of the device. When the device attains the desired resistance, oxidation of the thin-film surface is terminated and the device removed from the trimming apparatus for use.

Because it is difficult to control the oxidation of a thin metallic film by heating the film, anodization is the preferred technique. Anodization itself, however, is somewhat difficult to control, at least to that degree of accuracy which is required for the manufacture of precision resistors, and the like. Thus, in the prior art, the resistance of the device being anodized must be constantly monitored to ensure that the anodization process, which is essentially irreversible, is not carried on for too long a period, thereby ruining the device.

U.S. Pat. No. 3,341,444, which issued on Sept. 12, 1967, in the name of E. A. La Chapelle, and which is assigned to the assignee of the instant invention, discloses an apparatus which automatically performs this monitoring function, during the anodization process. As disclosed in that patent, the thin-film device to be trimmed to value is subjected to alternate cycles of anodization and resistance measurement. Since electric charges tend to accumulate upon the thin-film device being trimmed, during the anodization cycle, the resistance measurement cycle must be of sufficient duration to permit these charges to dissipate. If insufficient time is allowed, the charges will not dissipate fully, and any resistance measurements taken on the subsequent resistance measurement cycle may be subject to error. Thus, in the above-identified patent, the thin-film device is subjected to alternate anodization cycles of 50 milliseconds duration, and resistance measuring cycles of 125 milliseconds duration, the total time required to anodize a given device to value by this process being in the order of several minutes.

While the apparatus disclosed in the above-identified patent has proved highly successful in practice, it will be observed that anodization actually takes place during less than 28% of the total processing time. While this loss of time can be tolerated for the anodization of a few devices, it becomes uneconomical for large-scale processing when hundreds, or even thousands, of devices must be trimmed to value.

The problem then is to trim a thin-film device to value, by anodization, without spending a significant amount of processing time to continuously monitor the resistance of the device being trimmed. This problem has been solved, in the instant invention, by a method of trimming the resistance of a thin-film device to a predetermined value, which comprises the steps of: (a) measuring the initial resistance of the device; (b) anodizing the device for a first time interval to increase the resistance thereof towards said predetermined value; (c) re-measuring the resistance of the device after expiration of said first time interval; (d) calculating, by machine means, from said resistance measurements, the additional time interval which would be required to continue the anodization until the resistance of said device attains said predetermined resistance value; and (e) re-anodizing said device for said additional time interval so that the resistance of the device attains said predetermined resistance value. Advantageously, according to my invention, step (e) may be further modified by terminating the re-anodization prior to the expiration of said additional time interval, and, in that event, the method comprises the further step of (f) re-iterating steps (c) through (e), seriatim, until the resistance of the device is measured to be within $\pm\epsilon$ of said predetermined resistance value, where $\epsilon$ is the permissible tolerance on said predetermined resistance value.

DETAILED DESCRIPTION OF THE INVENTION

Figure 1:
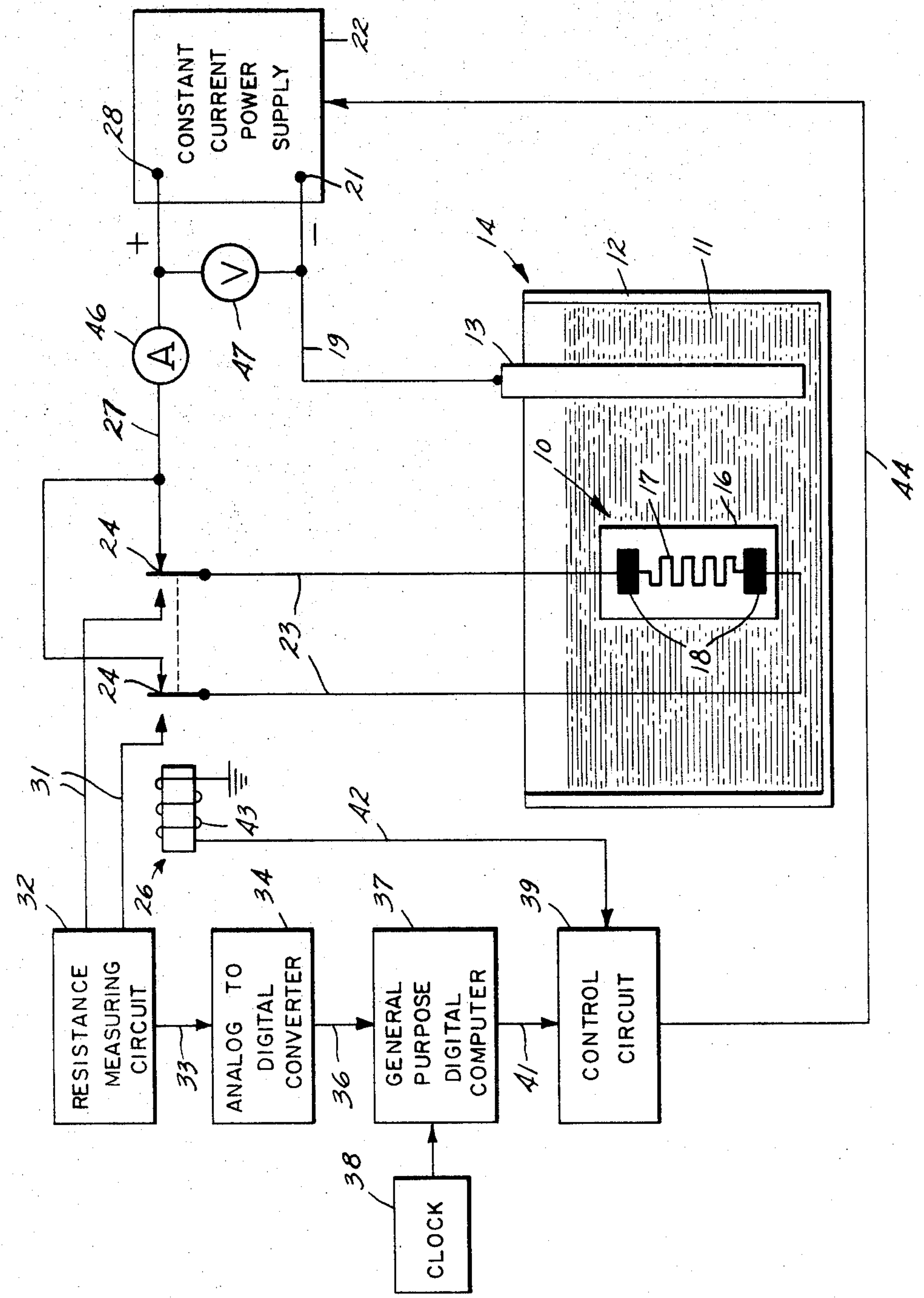
FIG. 1 is a partially schematic, partially block diagrammatic drawing of an illustrative anodization circuit, according to this invention.

FIG. 1 depicts an illustrative anodizing apparatus which may be used, according to this invention, to trim a thin-film resistor, or other device, to value. As shown in FIG. 1, a thin-film resistor 10, which is to be trimmed to value, is immersed in an electrolyte 11, which is contained within an electrically nonconducting tank 12. A cylindrical metal cathode 13 is positioned within tank 12 and, together with resistor 10 and electrolyte 11, forms an electrolytic anodizing cell 14. Typically, resistor 10 and cathode 13 will both comprise tantalum and; in that event, electrolyte 11 will typically comprise a 0.1% citric acid solution.

As is well known, resistor 10 comprises an insulating substrate 16 upon which a pattern 17 of a thin, film-forming metal is deposited. A pair of ohmic contacts 18 are deposited on substrate 16 at each end of pattern 17 to connect the device to the outside world. Typically, a layer of nonconductive material, such as wax (not shown) is applied to each of the contacts 18 to prevent the direct passage of current from each of the terminals 18 into the electrolyte 11, which current would tend to inhibit anodization of the metallic pattern 17 on resistor 10.

Cathode 13 is connected via a lead 19 to the negative terminal 21 of a constant current power supply 22. Each terminal 18 of resistor 10 nomally is connected via a pair of insulated leads 23 and break contacts 24 of relay 26 to the positive terminal 28 of power supply 22.

When relay 26 is operated, leads 23 are connected, via a corresponding pair of leads 31, to a resistance measuring circuit 32. The output of resistance measuring circuit 32 is connected, via lead 33, to the input of an analog-to-digital converter 34. Converter 34 converts the analog signal representative of the resistance of resistor 10 into digital form. These digital signals are fed from converter 34 over a conductor 36 into a general purpose digital computer 37. A clock circuit 38 is associated with computer 37 and provides timing signals therefor. A control circuit 39 is connected, via a lead 41, to the output of computer 37 to interface the computer, via a lead 42, with the control winding 43 of relay 26. Control circuit 39 is also connected, via a lead 44, to power supply 22 to discontinue current flow therefrom at the end of the anodization process. An ammeter 46 and a voltmeter 47 may be associated with power supply 22 for monitoring purposes, if desired.

Figure 2A:
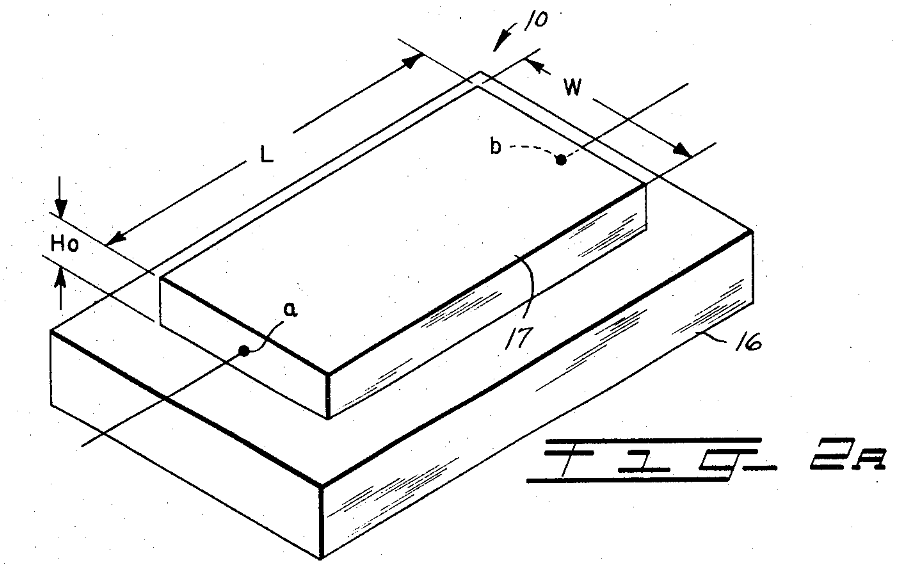
FIG. 2A is an isometric drawing of an idealized thin-film resistor of a type which may be advantageously trimmed to value by means of the apparatus illustrated in FIG. 1.

FIG. 2A illustrates resistor 10 in somewhat greater detail. For the sake of clarity, the illustration has been simplified by eliminating contacts 18 therefrom and by assuming that the pattern 17 of thin metallic film is rectangular, rather than denticulated. It will be appreciated, however, that the formulae to be derived below are applicable to other configurations of pattern 17, provided that they substantially approximate rectangular geometry.

As shown in FIG. 2A, the pattern of thin metallic film 17 has a length L, a width W, and an initial height $H_0$. The electrical resistance of pattern 17, measured between points *a* and *b*, will be given by the equation $$R=\frac{\rho L}{H_0 W} \quad (1)$$

where $\rho$ is the resistivity of the metallic film from which pattern 17 is fabricated.

Figure 2B:
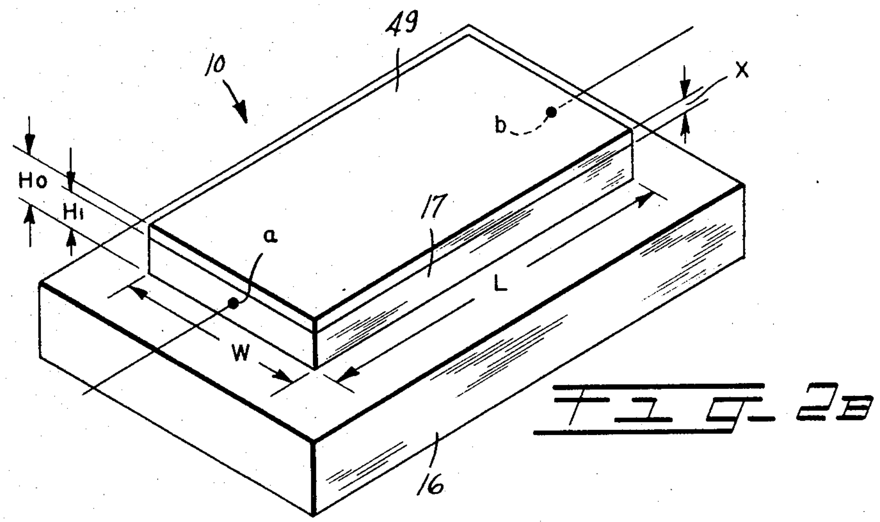
FIG. 2B is an isometric drawing of the thin-film resistor depicted in FIG. 2A after some initial period of anodization.

FIG. 2B illustrates thin-film resistor 10 after some initial period of anodization has been effected. As shown, a film of electrically nonconducting, anodic oxide 49 now overlies pattern 17 and has a thickness X. Since the total height $H_0$ of pattern 17 has not changed, it follows that the height $H_1$ of the unoxidized metal remaining is given by the equation $$H_1=H_0-X \quad (2)$$

Thus, as the anodization of resistor 10 proceeds, the depth of oxide film 49 will steadily increase and the height of the unoxidized metal film remaining will correspondingly decrease, thereby increasing the resistance of the thin-film resistor, as measured between points *a* and *b*.

If we assume that oxidation takes place uniformly on a surface whose area is WL and we further assume that the rate of oxidation is constant (as will substantially be the case if power supply 22 is a constant current source), then the height of the unoxidized metal film remaining at some instant of time, *t*, will be given by the equation.

$$H(t)=H_0(1-\alpha t) \quad (3)$$

where $H_0$ is the initial height of metallic pattern 17 prior to anodization and $\alpha$ is a constant. Substituting Equation 3 into Equation 2 we obtain Equation 4; namely, $$R=\frac{\rho L}{H_0(1-\alpha t)W} \quad (4)$$

$$=\frac{K}{1-\alpha t} \quad (5)$$

where K is a constant for any given conductive pattern 17.

Figure 3:
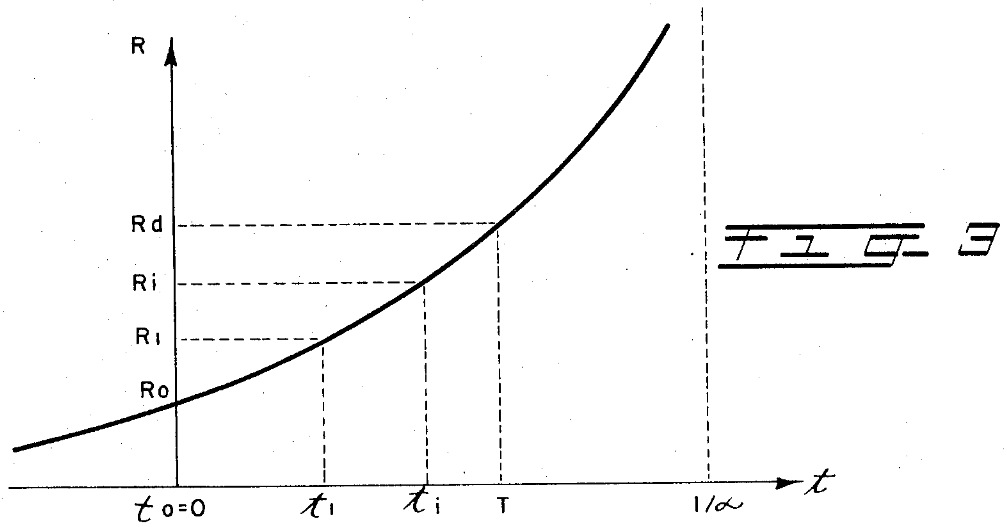
FIG. 3 is a graph which depicts the rate of change of resistance with time for the thin-film device illustrated in FIG. 2A.

As shown in FIG. 3, the plot of the resistance of pattern 17 versus time is a hyperbola. The time $t=0$ is chosen arbitrarily to be some instant of time before the resistance of pattern 17 has assumed the desired resistance value $R_d$, that is to say, the resistance value to which we wish to trim resistor 10. In FIG. 3 the time $t=T$ is that point of time at which the anodization of resistor 10 must be terminated if the resistance of resistor 10 is to exactly equal the desired resistance $R_d$. The shape of the hyperbola illustrated in FIG. 3 is dependent upon the value of the constants K and $\alpha$ in Equation 5 and will, in general, be different for each different conductive pattern 17. In addition, the constants K and $\alpha$ will also be dependent upon the rate at which anodization is occurring.

Because the anodization process can be characterized by the two constants K and $\alpha$, at least two resistance measurements are necessary to derive these constants. Advantageously, these measurements are made before the anodization process has proceeded too far. The point $t=0$ is one convenient point to take, and the corresponding resistance at this time may be defined as $R_0$. From experience, it is known that the oxidation process cannot be completed before some time $t=\tau$, thus, one can choose the second required point to be $t=t_1$, where $t_1=r\cdot\tau$, and $r$ is some fraction $\leqq 1$. If the resistance which is measured at $t=t_1$ is defined as $R_1$, then from Equation 5 one can write $$R_0=\frac{K}{1-\alpha\cdot(0)} \quad (6)$$

and $$R_1=\frac{K}{1-\alpha t_1} \quad (7)$$

Solving Equations 6 and 7 for K and $\alpha$ we obtain $$K=R_0 \tag{8}$$

and $$\alpha=\frac{R_1-R_0}{R_1t_1} \tag{9}$$

We have previously defined $R_d$ as the resistance we wish the thin-film device to ultimately attain. Thus, we wish to calculate the value of $t=T$, that is to say, the time at which the thin-film device will attain the resitance $R_d$. Thus, $$R_d=\frac{K}{1-\alpha T} \tag{10}$$

Inserting the values of K and $\alpha$ found from Equations 8 and 9 into Equation 10 we get:

$$R_d=\frac{R_0}{1-\frac{(R_1-R_0)T}{R_1t_1}} \tag{11}$$

Solving Equation 11 for T we get:

$$T=\frac{R_1t_1(R_d-R_0)}{R_d(R_1-R_0)} \tag{12}$$

Thus, from only two measurements, $R_0$ at time $t=0$ and $R_1$ at time $t=t_1$, Equation 12 predicts the time T when thin-film resistor 10 will assume the desired resistance value $R_d$.

In an ideal, noise-free situation, when, continuation of the anodization process for the total period of T units will insure that the thin-film device is trimmed up from its initial resistance $R_0$ to the desired resistance $R_d$. In any practical situation, however, there will always be some noise present and some degree of error in the measurements of $R_0$ and $R_1$. Thus, anodization to the time T, in general, will not result in the device actually attaining the desired resistance $R_d$, and there will generally be some undershoot or overshoot of the desired value. My invention, therefore, employs an iteration scheme in which at least one, and frequently several, more resistance measurements are taken during the anodization process.

In general, according to my invention, the next resistance measurement will be taken at the time $$t=t_1+r(T-t_1)$$

where $r$ is some fraction $\leqq 1$.

Thus, if the next measurement is made at $$t_2=t_1+r(T-t_1)$$

and the resistance which is measured at this time is defined as $R_2$, then recalculating K and $\alpha$ from the measurements of $R_1$ and $R_2$ made at times $t=t_1$ and $t=t_2$, respectively, we obtain:

$$R_1=\frac{K}{1-\alpha t_1} \tag{13}$$

and $$R_2=\frac{K}{1-\alpha t_2} \tag{14}$$

Solving Equations 13 and 14 for K and $\alpha$, we obtain:

$$K=\frac{R_1R_2(t_2-t_1)}{R_2t_2-R_1t_1} \tag{15}$$

and $$\alpha=\frac{R_2-R_1}{R_2t_2-R_1t_1} \tag{16}$$

Inserting these new values of K and $\alpha$ in Equation 10 we obtain:

$$R_d=\frac{\frac{R_1R_2(t_2-t_1)}{R_2t_2-R_1t_1}}{1-\frac{(R_2-R_1)T}{R_2t_2-R_1t_1}} \tag{17}$$

Solving Equation 17 for T, we get:

$$T=\frac{(R_d-R_1)R_2t_2-(R_d-R_2)R_1t_1}{R_d(R_2-R_1} \tag{18}$$

This new value of T is thus the revised estimate of the time at which the anodization process must be terminated if the thin-film device is to exactly attain the desired resistance $R_d$. However, once again, because of the noise present in the system and the uncertainties in the measurement of $R_1$ and $R_2$, the process is advantageously reiterated at least one or two more times. The iteration scheme can be described as follows: The time for resistance measurement is given by the equation $$t_i=t_{i-1}+r(T-t_{i-1}) \tag{19}$$

The estimated values of K and $\alpha$ are given by $$K=\frac{R_{ii}R_i-R_{i-1}t_{i-1})}{(R_it_{-1}(t_i-\ _{i-1})} \tag{20}$$

and $$\alpha=\frac{R_i-R_{i-1}}{R_it_i-R_{i-1}t_{i-1}} \tag{21}$$

Using these two equations to calculate T we get:

$$T=\frac{(R_d-R_{i-1})R_it_1-(R_d-R_i)R_{i-1}t_{i-1}}{R_d(R_i-R_{i-1})} \tag{22}$$

The iteration procedure should, of course, be terminated whenever the measured value of $R_i$ is found to be within the tolerance limits for $R_d$.

It will be recalled from Equation 19 that $t_i=t_{i-1}+r(T-t_{i-1})$, where $r$ is some constant $\leqq$ unity. If $r$ is made too small, the convergence of the reiteration procedure will be too slow. On the other hand, if $r$ is made too large, there is some danger of overshooting the desired resistance $R_d$. Generally speaking, the less noise and the less uncertainty present in the resistance measurements, the larger $r$ may be safely made. Thus, as the iteration procedure proceeds, $r$ may be made adaptive and after several resistance measurements have been made, $r$ can be allowed to increase towards unity to ensure rapid convergence of the reiteration. Typically, $r$ will be in the order of 0.5 at the beginning of the process, increasing by steps of 0.1, say, to about 0.8 or 0.9 as the last few resistance measurements are made. The exact value of $r$, however, will, of course, depend on the variables present in any given anodization apparatus.

Figure 4:
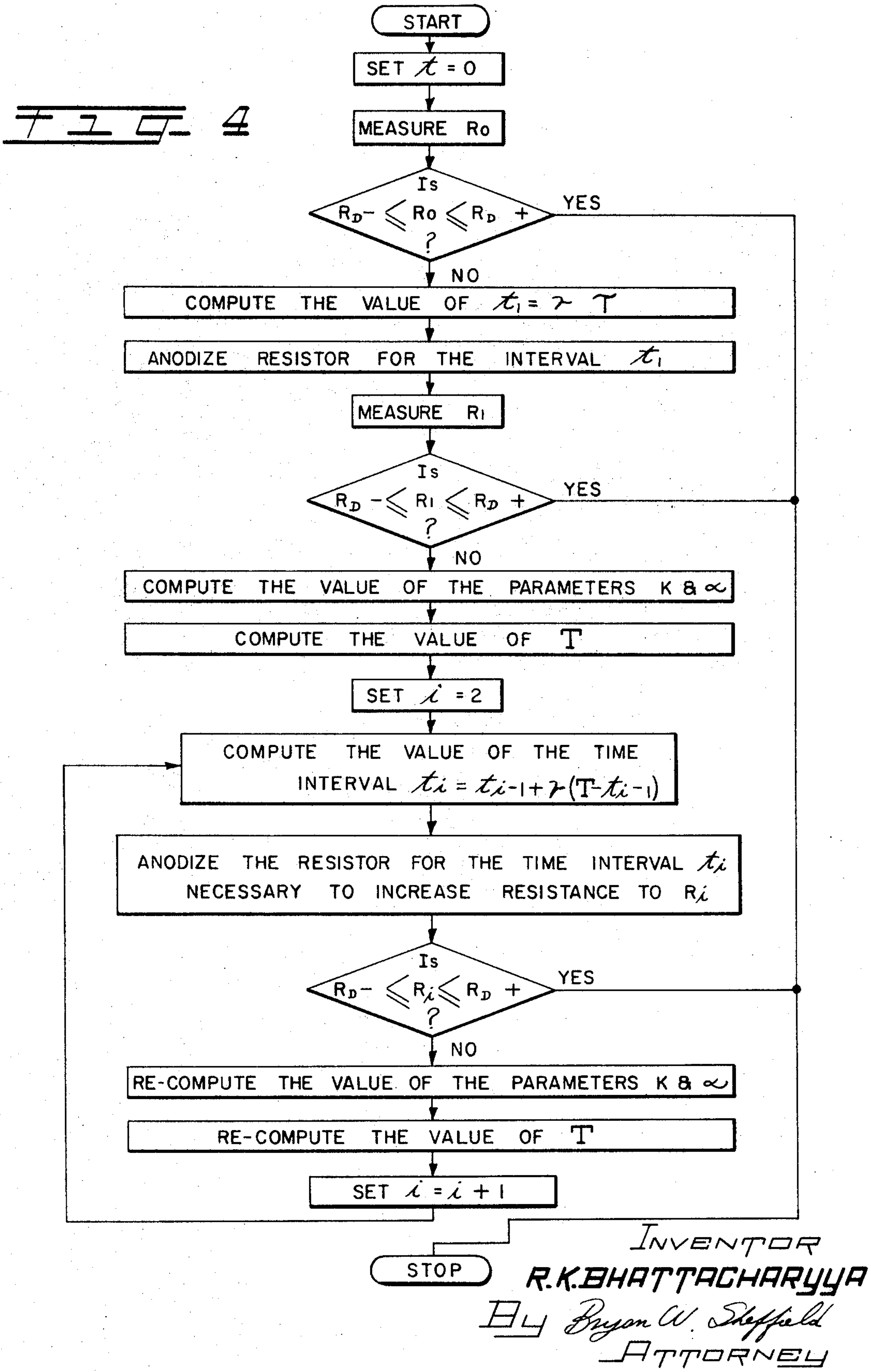
FIG. 4 is an illustrative flow chart which may be used, in accordance with this invention, to control the anodization of a thin-film device to value.

FIG. 4 depicts an illustrative, logical flow chart for implementing the above-described algorithm. This flow chart will be described in detail, starting at the top and working logically towards the bottom. As shown, the first step is to set the clock associated with the anodization apparatus to zero. Next, the initial resistance, $R_0$, of the thin-film device to be trimmed to value is measured. The computer then performs a calculation to determine whether or not the measured resistance $R_0$ falls within the upper tolerance limit, $R_d^+=R_d+\epsilon$, or the lower tolerance limit, $R_d^-=R_d-\epsilon$, of the desired resistance $R_d$. If $R_0$ is within the tolerance limits, the flow chart terminates the anodization process. If, as will generally be the case, $R_0$ is without these tolerance limits, a computation is made to obtain the value $t_1$, which is some fraction $r$ ($r\leqq 1$) of the total estimated time required to anodize the resistor up to the desired resistance $R_d$. The resistor is then anodized for the time interval $t_1$ and after anodizing current has been terminated, the new resistance value, $R_1$, at this time is measured. A computation is again made to determine if $R_1$ is within an acceptable neighborhood of $R_d$. If it is, the process is terminated. If it is not, a calculation is made, using the values of $R_0$, $R_1$, and $t_1$, to derive the parameters K and $\alpha$ of the equation characterizing the anodization process. Next, the time T which is required to bring the resistor to the exact value of $R_d$ is computed and a counter set to the value $i=2$.

Next, a computation is made to calculate the value of $t_i$, the time interval required to raise the resistance of the thin-film device to a value $R_i$, which is less than $R_d$. Analogously, the time $t_i$ is less than T but more than $t_1$. The anodization process is then resumed until the total elapsed time attains $t_i$ and the resistor has been brought up in value to $R_i$. This value is then measured and, once again, a computation made to determine if $R_i$ falls within an acceptable neighborhood of $R_d$. If it does, the process is terminated. If it does not, the parameters K and $\alpha$ are recomputed from the values of $R_i$, $R_1$, and $t_i$ and from the new equation which results, another value for T is computed. The fraction $r$ may now be made adaptively larger, if desired, and the value of $i$ which is stored in the counter increased by a factor of 1. At this point, the flow chart becomes re-entrant and the new value of $t_i$ is computed. The steps in this loop are reiterated, as often as need be, with continual adaptive changes being made to the fraction $r$, until the process is terminated, which will happen when $R_i$ is found to be within the desired tolerance limits for $R_d$.

One skilled on the art of computer programming can take the flow chart illustrated in FIG. 4 and prepare a detailed program listing in any of the known programming languages, such as PL/1, Fortran, Cobol, etc., or in any of the machine languages. The program listing so prepared could be implemented on any general purpose digital computer to control the anodization apparatus shown in FIG. 1. Similarly, one skilled in the art could construct a special purpose digital or analog computer to implement the above flow chart and control the apparatus shown in FIG. 1, if desired.

Returning now to FIG. 1, in operation, the thin-film resistor 10 to be trimmed is inserted within tank 12 so that it contacts the electrolyte 11. Computer 37 is then activated and, in turn, signals control circuit 39, via lead 41, to operate relay 26, via lead 42. Relay 26, operated, connects leads 23 from resistor 10, via leads 31, to resistance measuring circuit 32. Resistance measuring circuit 32 then measures the initial resistance $R_0$ of resistor 10. Analog-to-digial converter 34 nexts converts this resistance measurement into digital form, and these digital signals are fed, via lead 36, into the memory area of computer 37, where the information is stored until needed. The computer then performs the necessary computations to determine if $R_o$ is within the acceptable tolerance limits of $R_d$ and if, as will generally be the case, $R_o$ is not within these prescribed tolerance limits, computer 37 will instruct control circuit 39 to release relay 26 and energize power supply 22 to begin the first cycle of anodization.

After clock circuit 38 indicates to the computer the expiration of the time interval $t=t_1$, computer 37 again instructs control circuit 39 to operate relay 26, interrupting the anodization process. In an analogous manner to the measurement of the initial resistance $R_0$, the new resistance value of thin-film resistor 10 at this point of time, $R_1$, is measured and fed into the computer, which again performs the necessary computations to see if this revised resistance is within the acceptable tolerance limits of the desired resistance $R_d$. If, as will generally be the case, $R_1$ is still not within the tolerance limits of $R_d$, the computer calculates, from the above-described equations, the parameters K and $\alpha$ of the hyperbolic equation which characterizes the anodization process. As set forth in the flow chart illustrated in FIG. 4, this entire procedure is reiterated as many times as necessary until the resistance of resistor 10, as measured by circuit 32, does fall within the tolerance limits for the desired resistance $R_d$.

Because $r$ is made adaptive, the iteration rapidly converges; and thus, after only a few resistance measurements, the exact time, T, at which the anodization process must be terminated, will be known. After clock circuit 38 has indicated the expiration of this time T, computer 37 signals control circuit 39 to operate relay 26 and to turn off power supply 22, terminating the anodization process.

It will be noted that the instant process, unlike the prior art, permits rapid attainment of the desired resistance value $R_d$ in the minimum possible time and typically requires less than five resistance measurements. This is a significant improvement over the prior art, which typically requires hundreds of time-consuming resistance measurements.

Although the invention has been disclosed and described with reference to the trimming to value of thin-film resistors, one skilled in the art will appreciate that the principles of this invention can be adapted for use with other anodization processes, for example, the formation of a nonconducting dielectric film for the plates of a thin-film capacitor. Since the thickness of the original, unoxidized metallic film can be calculated (approximately) from the parameters of the sputtering process, the resistance of the unoxidized metallic film remaining yields an indication of the thickness of the oxide film which has been created. The thickness of this oxide film is, in the case of a thin-film capacitor, more important than the resistance of the underlying metal film. Further, one skilled in the art will appreciate that the invention is of use in applications where the anodic film is desired for decorative purposes, such as in the manufacture of decorative metal trim and jewelry. It will also be appreciated that the invention is not limited to anodization processes but is of use in any process where a linearly time-varying function affects the parameters of the workpiece being processed.

One skilled in the art may also make various changes and modifications to the apparatus and methods disclosed herein without departing from the spirit and scope of the invention.

What is claimed is:

1. A method of trimming a thin-film device so that the electrical resistance thereof attains some predetermined value, comprising the steps of:

(a) measuring the initial resistance of the device;

(b) anodizing the device for a first time interval to increase the resistance thereof towards said predetermined value;

(c) re-measuring the resistance of said device after expiration of said first time interval;

(d) calculating, by machine means, from said resistance measurements, the additional time interval which would be required to continue the anodization until the resistance of said device attains said predetermined resistance value; and (e) re-anodizing said device for said additional time interval so that the resistance of said device attains said predetermined resistance value.

2. The method according to claim 1 wherein said re-anodizing step (paragraph (e)) is terminated prior to the expiration of said additional time interval and the method comprises the further step of:

(f) reiterating steps (c) through (e), seriatim, until the resistance of the device is measured to be within $\pm\epsilon$ of said predetermined resistance value, where $\epsilon$ is the premissible tolerance on said predetermined resistance value.

3. The method according to claim 2, comprising the further step of, prior to each anodizing and re-anodizing step:

determining, by machine means, if the resistance of said thin-film device has attained said predetermined resistance value within said $\pm\epsilon$ tolerance limits.

4. The method according to claim 2, comprising the further step of:

adaptively changing the parameters utilized by said machine means in performing said calculating step, as said reiteration proceeds, so that the resistance of said device is rapidly converged towards said predetermined resistance value.

5 A method of adjusting the electrical resistance ot a thin-film device so that said resistance falls between prescribed tolerance limits, comprising the steps of:

(a) measuring the initial resistance of the device;

(b) anodizing the device for a first interval of time to increase the resistance of the device, said first interval of time being a fraction *r* of the estimated interval of time which would be required to increase the resistance of the device to a value which falls within said tolerance limits;

(c) re-measuring the resistance of said device after said anodizing step has been terminated;

(d) calculating, by machine means, from said resistance measurements and the duration of said first interval of time, the parameters of the equation which describes the change in resistance of said device, as a function of time, during said anodization step;

(e) calculating, by machine means, from the parameters of said equation, the precise interval of time which would be required to increase the resistance of said device, by anodization, from said initial resistance to a value which falls within said tolerance limits;

(f) resuming the anodization of said device for a second interval of time which is a fraction *r* of the difference between said precise interval of time and said first interval of time;

(g) measuring the resistance of the device, after said resumed anodization step has been terminated;

(h) recalculating, by machine means, from said resistance measurements and said first and second intervals of time, revised parameters for said equation;

(i) recalculating, by machine means, from the revised parameters of said equation, said precise time interval;

(j) adaptively increasing the magnitude of the fraction *r*; and (k) reiterating the steps set forth in paragraphs (f) through (j), seriatim, until the resistance of the device falls within said prescribed tolerance limits.

6. The method as set forth in claim 5, comprising the further step of, prior to each anodization step:

comparing, by machine means, the present resistance value of the device with the upper and lower prescribed tolerance limits to determine if the adjusting process may be terminated.

7. A method of anodizing a thin-film resistor to a predetermined value, comprising the steps of:

(a) generating a first electrical signal representative of the initial resistance of said thin-film resistor;

(b) anodizing said thin-film resistor for a first time interval to increase the resistance thereof to some intermediate value which is less than said predetermined value;

(c) generating a second electrical signal representative of the increased resistance of said thin-film resistor;

(d) generating a third electrical signal representative of said first time interval;

(e) computing, from said first, second and third electrical signals, the parameters of the equation which describes the anodization process to which said resistor has been subjected;

(f) computing, from said equation, the time interval which would be required for said anodization process to increase the resistance of said thin-film resistor from said intermediate value to said predetermined value;

(g) generating a fourth electrical signal representative of said second time interval; and (h) resuming the anodization of said thin-film resistor, under control of said fourth electrical signal, so that said thin-film resistor assumes said predetermined value.

8. The method according to claim 7, wherein said resumed anodization step (paragraph (h)) is interrupted, prior to expiration of said second time interval; and the method comprises the further step of:

reiterating the steps set forth in paragraphs (c) through (h), seriatim, until said resistor assumes said predetermined value to within $\pm\epsilon$, where $\epsilon$ is the tolerance limit on said predetermined value.

9. The method according to claim 7, including the further steps of, prior to each reiterated anodization step:

computing, from the electrical signals representative of the resistance of said thin-film resistor, whether or not said resistor has assumed the predetermined value, within the tolerance limit $\pm\epsilon$; and, if said resistance *has* assumed said predetermined value within the tolerance limits $\pm\epsilon$, terminating the anodization process, under control of said computation.

10. An apparatus for anodizing a thin-film resistor to a predetermined value, which comprises:

a tank for containing an electrolytic solution;

a cathode, supported within said tank, to contact said electrolytic solution;

means for supporting said resistor within said tank to contact said electrolytic solution, said resistor acting as an anode and, together with said cathode and said electrolytic solution, forming an electrolytic cell;

circuitry for supplying an electric current to said anode and to said cathode to anodize said resistor;

means for measuring the electrical resistance of said thin-film resistor to generate an electrical signal representative thereof;

bistable switching means, serially connected in said current supplying circuitry, for intermittently interrupting said current and connecting said resistor to said measuring means; and computing means, connected to said measuring means and said bistable switching means, for terminating the anodization of said resistor when said resistor has attained said predetermined value.

11. In an anodization process of the type wherein an insulating anodic oxide film is formed upon a conducting film of film-forming valve-metal of known thickness, a method of controlling the amount of anodic oxide formed, comprising the steps of:

(a) measuring the electrical resistance of the conducting valve-metal film, prior to anodization;

(b) anodizing the conducting valve-metal film for an interval of time sufficient to form a layer of anodic oxide thereon, said anodic oxide reducing the volume of underlying unoxidized valve-metal remaining;

(c) measuring the electrical resistance of said valve-metal film remaining, after said anodizing has been terminated;

(d) calculating, by machine means, the parameters of the equation characterizing the anodization process;

(e) predicting, by machine means, from said equation, the time interval required to reduce the remaining thickness of said conducting film of valve-metal to a predetermined value; and (f) terminating said anodization process upon expiration of said predicted time interval.

12. The method according to claim 11, wherein said anodization process is terminated substantially prior to the expiration of said predicted time interval, the method comprising the further step of:

(g) reiterating the method steps set forth in paragraphs (c) through (g), seriatim, until said anodic oxide film has reached the desired thickness.

13. The method according to claim 12, comprising the further step of:

adaptively altering the factors used in said calculating step, as said reiteration proceeds, so that the thickness of said anodic oxide film rapidly converges towards the desired thickness.

14. In an anodization process of the type wherein the electrical resistance of a thin-film device R, as a function of the time $t$ that the device has been subjected to anodization, may be expressed by the equation $R=K/(1-\alpha t)$, where K and $\alpha$ are both constants for any given anodization process, the method of adjusting the resistance of the device to some predetermined desired resistance value, $R_d$, which comprises the steps of:

(a) measuring the initial resistance of the device, $R_0$ prior to any anodization of the device;

(b) anodizing the device for a time interval $t_1$ units, where $t_1=r\cdot\tau$; $r$ is some fraction $\leq 1$ and $\tau$ is the estimated time to increase the resistance of the device from $R_0$ to $R_d$;

(c) measuring the resistance of the device, $R_1$, after said anodizing step has been terminated;

(d) computing, via machine means, the value of the constants K and $\alpha$ according to the equations $$K=R_0$$

and $$\alpha=\frac{R_1-R_0}{R_1 t_1}$$

(e) computing, via machine means, the actual time internal T required to increase the resistance of the device from $R_0$ to $R_d$, according to the equation $$T=\frac{R_d-K}{R_d\alpha}$$

where

K and $\alpha$ are the constants computed in step (d); and (f) anodizing the device for the interval T so that the resistance of the device is increased from the initial resistance $R_0$ to the desired resistance $R_d$.

15. The method according to claim 14 wherein said anodizing step (f) is terminated prior to the expiration of the time interval T and the method comprises the further steps of:

(g) measuring the intermediate resistance of the device, $R_i$, at the intermediate time intervals $t_i$, where $t_i$ is given by the equation $$t_i=t_{i-1}+r(T-t_{i-1})$$

and $i$ is a positive integer $\geqq 2$; and (h) computing, via machine means, the value of the constants K and $\alpha$ according to the equations $$K=\frac{R_i R_{i-1}(t_i-t_{i-1})}{(R_i t_i-R_{i-1}t_{i-i})}$$

and $$\alpha=\frac{R_i-R_{i-1}}{R_i t_i-R_{i-1}t_{i-1}}$$

(i) computing, via machine means, the actual time interval T required to increase the resistance of the device from $R_0$ to $R_d$, according to the equation $$T=\frac{(R_d-R_{i-1})R_i t_i-(R_d-R_i)R_{i-1}t_{i-1}}{R_d(R_i-R_{i-1})}$$

and (j) reiterating method steps (g) through (i), seriatim, incrementing $i$ according to the equation $i=i+1$ for each iteration, until the resistance of the device is increased from $R_0$ to $R_d$.

16. The method according to claim 15 wherein $r$ is made adaptively larger during successive iterations of the method so that the resistance of the device rapidly converges towards the desired resistance $R_d$.

References Cited

UNITED STATES PATENTS

| | | | |
|---|---|---|---|
| 3,563,862 | 2/1971 | Joly et al. | 204—15 |
| 3,148,129 | 9/1964 | Basseches et al. | 204—228 |
| 3,341,444 | 9/1967 | La Chapelle | 204—228 |
| 3,341,445 | 9/1967 | Gerhard | 204—228 |

JOHN H. MACK, Primary Examiner

T. TUFARIELLO, Assistant Examiner

U.S. Cl. X.R.

204—228